(12) United States Patent
Koyama et al.

(10) Patent No.: US 11,804,781 B2
(45) Date of Patent: Oct. 31, 2023

(54) ELECTRONIC CIRCUIT AND METHOD

(71) Applicant: KABUSHIKI KAISHA TOSHIBA, Tokyo (JP)

(72) Inventors: Masahiro Koyama, Shinagawa (JP); Yusuke Hayashi, Yokohama (JP); Kazuto Takao, Tsukuba (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/682,401

(22) Filed: Feb. 28, 2022

(65) Prior Publication Data
US 2023/0080361 A1    Mar. 16, 2023

(30) Foreign Application Priority Data

Sep. 13, 2021 (JP) ................................ 2021-148895

(51) Int. Cl.
*H02M 3/335* (2006.01)
*H02M 3/00* (2006.01)

(52) U.S. Cl.
CPC ......... *H02M 3/33571* (2021.05); *H02M 3/01* (2021.05)

(58) Field of Classification Search
CPC ............. H02M 3/335; H02M 3/33507; H02M 3/33538; H02M 3/33546; H02M 3/33569; H02M 3/01
See application file for complete search history.

(56) References Cited

U.S. PATENT DOCUMENTS

| | | | | |
|---|---|---|---|---|
| 5,877,951 A | * | 3/1999 | Mweene | ........... H02M 3/33573 363/41 |
| 9,106,141 B2 | | 8/2015 | Hosotani | |

(Continued)

FOREIGN PATENT DOCUMENTS

| | | |
|---|---|---|
| JP | 2011-176973 A | 9/2011 |
| JP | 2012-143106 A | 7/2012 |

(Continued)

OTHER PUBLICATIONS

Qiu et al., "High-Power-Density 400VDC-19VDC LLC Solution with GaN HEMTs", WiPDA Asia'18, 2018, 7 pages.

(Continued)

*Primary Examiner* — Gary L Laxton
(74) *Attorney, Agent, or Firm* — Oblon, McClelland, Maier & Neustadt, L.L.P.

(57) ABSTRACT

Electronic circuitry includes a resonant circuit to receive a square-wave voltage based on a first DC voltage and generate a first voltage; a first transmission circuit to transmit the first voltage via a transformer including a primary inductor and a secondary inductor; a second transmission circuit to transmit the first voltage via a first capacitor and a second capacitor, the first capacitor being electrically connected to a first end of the primary inductor, the second capacitor being electrically connected to a second end of the primary inductor; a rectifier circuit to rectify the first voltage and generate a second DC voltage, the first voltage being transmitted by the first transmission circuit or the second transmission circuit; a first switch circuit configured to connect the first transmission circuit and the rectifier circuit; and a second switch circuit to connect the second transmission circuit and the rectifier circuit.

17 Claims, 9 Drawing Sheets

1A

(56) References Cited

U.S. PATENT DOCUMENTS

| | | |
|---|---|---|
| 10,011,179 B2 | 7/2018 | Spesser |
| 10,770,979 B2 | 9/2020 | Sato et al. |
| 2012/0169135 A1 | 7/2012 | Yamamoto et al. |
| 2020/0007044 A1* | 1/2020 | Sato .................. H02M 1/08 |
| 2021/0273567 A1* | 9/2021 | Sigamani .......... H02M 3/33571 |
| 2022/0278622 A1* | 9/2022 | Nishimoto ........ H02M 3/33571 |
| 2022/0286061 A1 | 9/2022 | Hayashi et al. |

FOREIGN PATENT DOCUMENTS

| | | |
|---|---|---|
| JP | 6352970 B2 | 7/2018 |
| JP | 2018-174648 A | 11/2018 |
| JP | 2020-107434 A | 7/2020 |
| JP | 2020-107437 A | 7/2020 |
| JP | 2022-133822 A | 9/2022 |
| WO | WO 2012/101905 A1 | 8/2012 |

OTHER PUBLICATIONS

Hayashi et al., "Transformerless multicellular dc-dc converter for highly efficient next generation dc distribution system", ECCE'17, 2017, 9 pages.

* cited by examiner

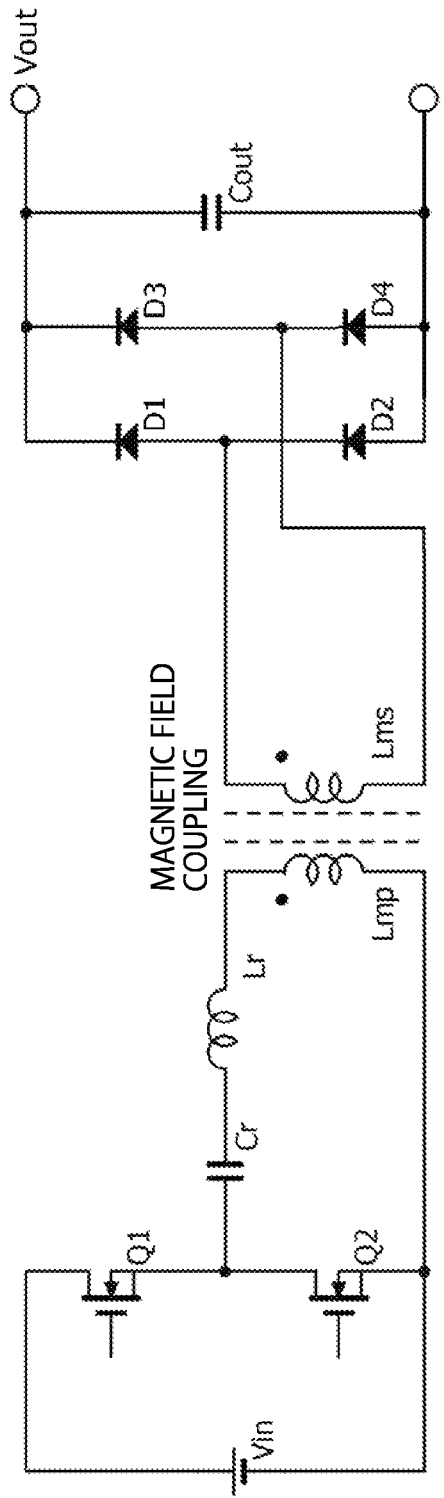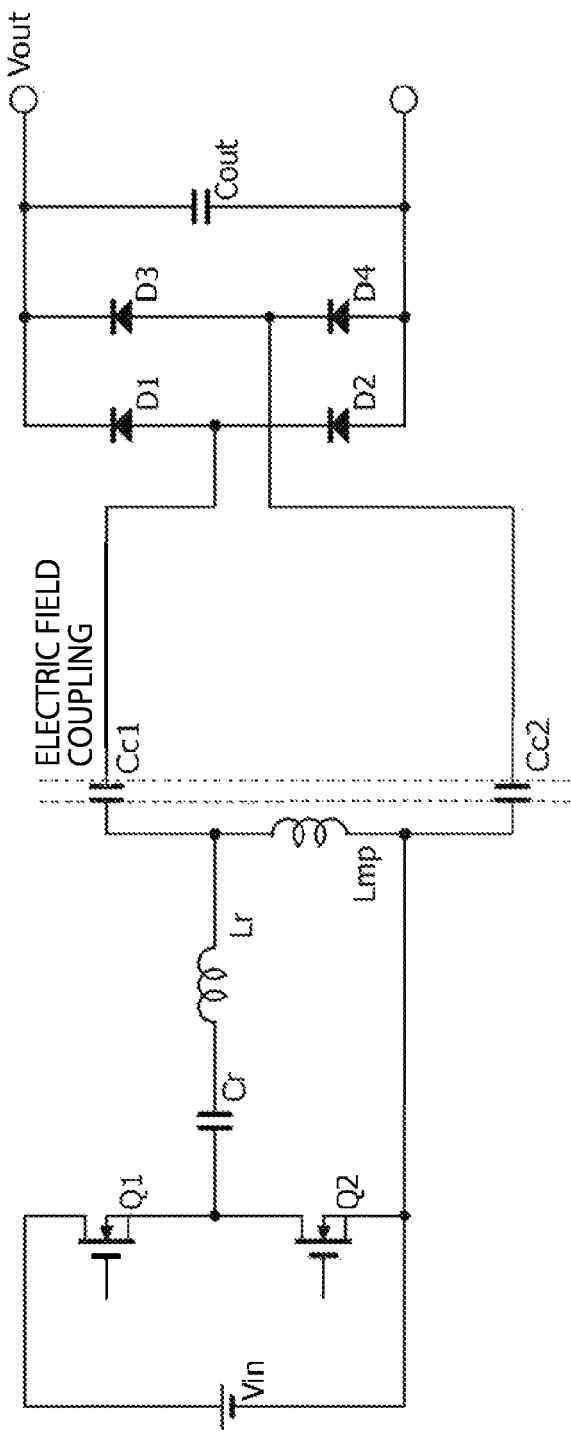
FIG. 2A
FIG. 2B

ELECTRONIC CIRCUIT AND METHOD

CROSS REFERENCE TO RELATED APPLICATIONS

This application is based upon and claims the benefit of priority from the prior Japanese Patent Application No. 2021-148895, filed on Sep. 13, 2021, the entire contents of which are incorporated herein by reference.

FIELD

The present disclosure relates to electronic circuitry and a method.

BACKGROUND

An LLC resonant converter is known as a DC-DC converter that achieves both high efficiency and low noise. The LLC resonant converter is named for the fact that it utilizes the resonance between the leakage inductance of a transformer, a primary inductance (excitation inductance), and a capacitor. The LLC resonant converter alternately turns on a plurality of switching elements to generate a square-wave voltage from a DC voltage and inputs the square-wave voltage to a resonant circuit. A sinusoidal voltage generated by the resonant circuit is converted by a transformer and the converted voltage is rectified. Thus, a converted DC voltage is obtained.

When it is desirable to obtain a converted voltage sufficiently lower (e.g., by one digit or more) than the input DC voltage, it is a common practice to reduce the number of windings of secondary winding in the transformer compared to the number of windings of primary winding so as to adjust a step-down ratio. In this case, a power loss generated in the secondary winding is small and in addition, the occupation ratio of the secondary winding in the size of the transformer is smaller than that of the primary windings. On the other hand, when it is desirable to obtain a converted voltage that is as high as or about half as high as the input DC voltage, it is conceivable to use windings of the secondary winding in the transformer as much as the number of windings of the primary winding. However, this method causes an increase in a power loss in the secondary winding and an increase in the size of the transformer. Although it may be possible to adjust a ratio between an output voltage and an input voltage by adjustment of the frequency (operation frequency) of switching, there is a limit to an adjustment range.

BRIEF DESCRIPTION OF THE DRAWINGS

FIG. 2A and FIG. 2B are diagrams illustrating equivalent circuits in the case of selecting a first transmission circuit and a second transmission circuit, respectively;

DETAILED DESCRIPTION

Figure 1:
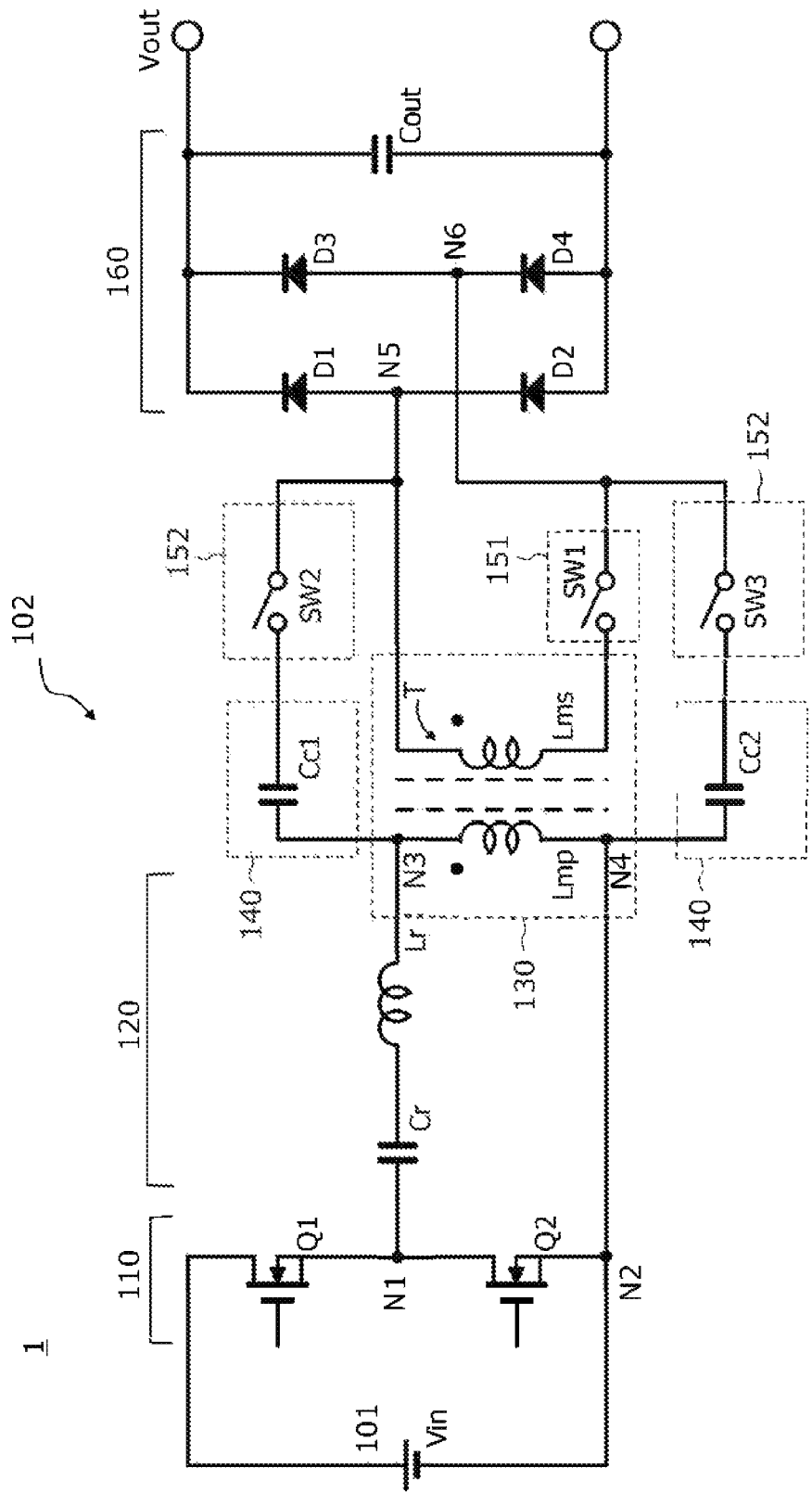
FIG. 1 is a block diagram of electronic circuitry 1 according to a first embodiment.

According to one embodiment, electronic circuitry includes a resonant circuit configured to receive a square-wave voltage based on a first DC voltage and generate a first voltage; a first transmission circuit configured to transmit the first voltage via a transformer including a primary inductor and a secondary inductor; a second transmission circuit configured to transmit the first voltage via a first capacitor and a second capacitor, the first capacitor being electrically connected to a first end of the primary inductor, the second capacitor being electrically connected to a second end of the primary inductor; a rectifier circuit configured to rectify the first voltage and generate a second DC voltage, the first voltage being transmitted by the first transmission circuit or the second transmission circuit; a first switch circuit configured to connect the first transmission circuit and the rectifier circuit; and a second switch circuit configured to connect the second transmission circuit and the rectifier circuit.

Hereinafter, embodiments of the present invention will be described with reference to drawings. The same components in the drawings are denoted by the same reference signs to appropriately omit their descriptions.

First Embodiment

FIG. 1 is a block diagram of electronic circuitry 1 (electronic device) according to a first embodiment. The electronic circuitry 1 includes a voltage source 101 that provides an input voltage (first DC voltage); and an LLC resonant converter 102 that converts the input voltage into an output voltage (second DC voltage).

The LLC resonant converter 102 includes: a square-wave generation circuit 110 that generates a square-wave voltage by modulating the input voltage provided by the voltage source 101; and a resonant circuit 120 that generates a voltage (first voltage) by resonance by using the square-wave voltage as an input. The voltage (first voltage) generated by the resonant circuit 120 is, for example, a sinusoidal voltage (AC voltage). The LLC resonant converter 102 includes: a first transmission circuit 130 that transmits the sinusoidal voltage by using magnetic coupling of a transformer T; and a second transmission circuit 140 that transmits the sinusoidal voltage by electric field coupling by capacitors Cc1 and Cc2. In addition, the LLC resonant converter 102 includes: a switch circuit 151 that connects between the first transmission circuit 130 and a rectifier circuit 160; and a switch circuit 152 that connects between the second transmission circuit 140 and the rectifier circuit 160. Furthermore, the LLC resonant converter 102 includes the rectifier circuit 160 that rectifies the sinusoidal voltage transmitted by the first transmission circuit 130 or the second transmission circuit 140 and converts it into a DC output voltage Vout. An output of the rectifier circuit 160 is connected to a load device which is not illustrated. The load device may be a device that consumes current based on the output voltage or may be another LLC converter that converts the magnitude of the output voltage.

The square-wave generation circuit 110 includes switching elements Q1 and Q2 that are connected in series to the voltage source 101. The switching elements Q1 and Q2 have a half bridge configuration. The switching elements Q1 and Q2 are N-type metal-oxide-semiconductor field-effect transistors (MOSFET). However, the switching elements Q1 and Q2 may be another type of transistors such as: unipolar transistors such as junction field effect transistors (JFET) and high electron mobility transistors (HEMT); and bipolar transistors such as insulated gate bipolar transistors (IGBT). For example, when a high voltage output on the order of several hundred volts is assumed, the switching elements Q1 and Q2 may be power transistors made of Si, SiC, or GaN. A connection node between the switching elements Q1 and Q2 corresponds to a first output end N1 of the square-wave generation circuit 110; and a node of the switching element Q2 which is on the opposite side of the first output end N1 corresponds to a second output end N2 of the square-wave generation circuit 110.

The square-wave generation circuit 110 modulates an input voltage Vin by alternately turning on the switching elements Q1 and Q2 according to an operation frequency fsw (switching frequency of the switching elements Q1 and Q2). This generates a square-wave voltage (square pulse voltage) having a desired duty ratio. A modulation scheme used may be pulse width modulation (PWM), pulse frequency modulation (PFM), or the like. The generated square-wave voltage is input to the resonant circuit 120. The duty ratio is not limited to a specific value; however, it is ½, for example.

The resonant circuit 120 includes a capacitor Cr (third capacitor), an inductor Lr (first inductor), and a primary inductor Lmp of the transformer T. A leakage inductor of the transformer T may be treated as the inductor Lr. The capacitor Cr and the inductor Lr are connected in series between the first output end N1 of the square-wave generation circuit 110 and a first end of the primary inductor Lmp (first output end N3 of the resonant circuit 120). The resonant frequency fr of the resonant circuit 120 depends on the capacitance value of the capacitor Cr and the inductance value of the inductor Lr; and it further depends on the capacitance values of the capacitors Cc1 and Cc2 that are electrically connected to the inductor Lr. The resonant circuit 120 outputs a voltage (sinusoidal voltage) having a frequency according to the operation frequency fsw (frequency of a square wave), based on the square-wave voltage that is input from the square-wave generation circuit 110.

The first transmission circuit 130 includes the transformer T. The transformer T includes the primary inductor Lmp and the secondary inductor Lms. The transformer T transmits a sinusoidal voltage received by the primary inductor Lmp to the secondary inductor Lms by using magnetic coupling between the primary inductor Lmp and the secondary inductor Lms. The sinusoidal voltage is converted into the one having a magnitude according to the ratio of the number of windings in the secondary inductor Lms to that in the primary inductor Lmp; and the converted voltage is induced in the secondary inductor Lms. A first end of the secondary inductor Lms is connected to a first input end N5 in the rectifier circuit 160. A second end of the secondary inductor Lms is connected to a second input end N6 in the rectifier circuit 160 via a switch SW1. When the switch SW1 is on, the first transmission circuit 130 transmits the sinusoidal voltage received from the resonant circuit 120, to the rectifier circuit 160 in a subsequent stage via the transformer T (by magnetic coupling).

The second transmission circuit 140 includes the capacitor Cc1 (first capacitor) that is electrically connected to the first end of the primary inductor Lmp (first output end N3 of the resonant circuit 120). In addition, the second transmission circuit 140 includes the capacitor Cc2 (second capacitor) that is electrically connected to the second end of the primary inductor Lmp (second output end N4 of the resonant circuit 120). The capacitor Cc1 is connected to the first input end N5 in the rectifier circuit 160 via a switch SW2. The capacitor Cc2 is connected to the second input end N6 in the rectifier circuit 160 via a switch SW3. When the switches SW2 and SW3 are on, the second transmission circuit 140 transmits the sinusoidal voltage received from the resonant circuit 120, to the rectifier circuit 160 in a subsequent stage via the capacitors Cc1 and Cc2 (by electric field coupling). The capacitors Cc1 and Cc2 each includes a first electrode that receives a sinusoidal voltage and a second electrode; and transmits the voltage to a second electrode side by electric field coupling between the first electrode and the second electrode. It is noted that the capacitors Cc1 and Cc2 may form part of the resonant circuit 120. It is further noted that the capacitor Cr1 in the resonant circuit 120 also may form part of the second transmission circuit 140 together with the capacitors Cc1 and Cc2.

The switch circuit 151 switches between connection and disconnection of the first transmission circuit 130 and the rectifier circuit 160. The switch circuit 151 includes the switch SW1. The switch SW1 (fourth switch) connects between a second terminal of the secondary inductor Lms and the second input end N6 of the rectifier circuit 160.

The switch circuit 152 switches between connection and disconnection of the second transmission circuit 140 and the rectifier circuit 160. The switch circuit 152 includes the switches SW2 and SW3. The switch SW2 (first switch) connects between the capacitor Cc1 and the first input end N5 of the rectifier circuit 160. The switch SW3 (second switch) connects between the capacitor Cc2 and the second input end N6 of the rectifier circuit 160.

When an output voltage (sinusoidal voltage) of the resonant circuit 120 is to be input to the second transmission circuit 140, the switch SW2 and switch SW3 in the switch circuit 152 are turned on, thereby connecting between the second transmission circuit 140 and the rectifier circuit 160. The switch SW1 in the switch circuit 151 is turned off to disconnect between the first transmission circuit 130 and the rectifier circuit 160.

When an output voltage (sinusoidal voltage) of the resonant circuit 120 is to be input to the first transmission circuit 130, the switch SW1 in the switch circuit 151 is turned on, thereby connecting between the first transmission circuit 130 and the rectifier circuit 160. The switch SW2 and switch SW3 in the switch circuit 152 are turned off to disconnect between the second transmission circuit 140 and the rectifier circuit 160.

The rectifier circuit 160 includes diodes D1, D2, D3, and D4, and an output capacitor Cout. The diodes D1 to D4 may be diodes of any kind. For example, when a high voltage output on the order of several hundred volts is assumed, an Sic-Schottky barrier diode (SiC-SBD) may be used. The diodes D1, D2, D3, and D4 have a full bridge configuration. That is, the diodes D1 and D2 are connected in series and the diodes D3 and D4 are connected in series. The diodes D3 and D4 are connected in parallel to the diodes D1 and D2. The output capacitor Cout is connected in parallel to the diodes D1 and D2, and is also connected in parallel to the diodes D3 and D4. The rectifier circuit 160 rectifies a voltage (sinusoidal voltage) that is input from the first transmission circuit 130 or the second transmission circuit 140, and smooths the rectified voltage by the output capacitor Cout. The rectifier circuit 160 outputs the smoothed voltage as an output voltage after conversion, Vout.

The switch circuits 151 and 152 complementarily turn on or off the switch SW1 and the switches SW2 and SW3 according to an output voltage setting (target value), to select the first transmission circuit 130 or the second transmission circuit 140. That is, they select either a transmission path by magnetic coupling using the first transmission circuit 130 or a transmission path by electric field coupling using the second transmission circuit 140.

When the output voltage setting (target value) is smaller than a predetermined voltage threshold, the switch SW1 is turned on and the switches SW2 and SW3 are turned off, to select the first transmission circuit 130. This causes a sinusoidal voltage to be transmitted via the transformer T and the transmitted voltage to be input to the rectifier circuit 160. At this time, the voltage is stepped down according to the ratio of the number of windings between the primary inductor and the secondary inductor. The number of windings of the secondary inductor is adjusted in advance according to the output voltage setting. For a small output voltage, a small number of windings of the secondary inductor is only required, and this results in only a small loss.

FIG. 2A is an equivalent circuit diagram of FIG. 1 when the first transmission circuit 130 is selected, that is, when the switch SW1 is turned on and the switches SW2 and SW3 are turned off. The output voltage of the resonant circuit 120 is transmitted by magnetic coupling using the transformer T and the transmitted voltage is provided to the rectifier circuit 160.

On the other hand, when the output voltage setting (target value) is larger than a predetermined voltage threshold, the switch SW1 is turned off and the switches SW2 and SW3 are turned on, to select the second transmission circuit 140. This causes a sinusoidal voltage to be transmitted through electric field coupling by the capacitors Cc1 and Cc2 and the transmitted voltage is provided to the rectifier circuit 160. In the case of electric field coupling, the magnitude of voltage does not change before and after the coupling. The capacitors Cc1 and Cc2 has a function of interrupting the DC component of a current and electrically insulating a resonant circuit 120 side and a rectifier circuit 160 side. For the DC rated voltage, namely the DC withstand voltage, of the capacitors Cc1 and Cc2, it is preferable to select about the same value as the withstand voltage between the primary inductor Lmp and secondary inductor Lms of the transformer T.

FIG. 2B is an equivalent circuit diagram of FIG. 1 when the second transmission circuit 140 is selected, that is, when the switch SW1 is turned off and the switches SW2 and SW3 are turned on. An output voltage of the resonant circuit 120 is transmitted through the capacitors Cc1 and Cc2 and is provided to the rectifier circuit 160.

Hereafter, operation when the duty ratio of a square-wave voltage is ½ will be considered as a specific example. When the output voltage setting (target value) is a large voltage such as the one at ½ of an input voltage Vin (Vin/2), the second transmission circuit 140 is selected. That is, a transmission path by electric field coupling is selected. In one example, a voltage having the amplitude of Vin/2 is input to the capacitors Cc1 and Cc2; and the input voltage is transmitted to a subsequent stage by electric field coupling of the capacitors Cc1 and Cc2. This allows a large voltage to be transmitted to the rectifier circuit 160 with a low loss. On the other hand, when the target value is a small voltage such as the one at 1/16 of an input voltage Vin (Vin/16) (when the voltage needs to be stepped down), the first transmission circuit 130 is selected. That is, a transmission path by magnetic coupling is selected. A voltage at Vin/2 from the resonant circuit 120 is converted into a smaller voltage in the transformer T and the converted voltage is transmitted to a subsequent stage. Since the secondary inductor in the transformer T has a small number of windings, the voltage can be transmitted with a low loss.

Figure 3:
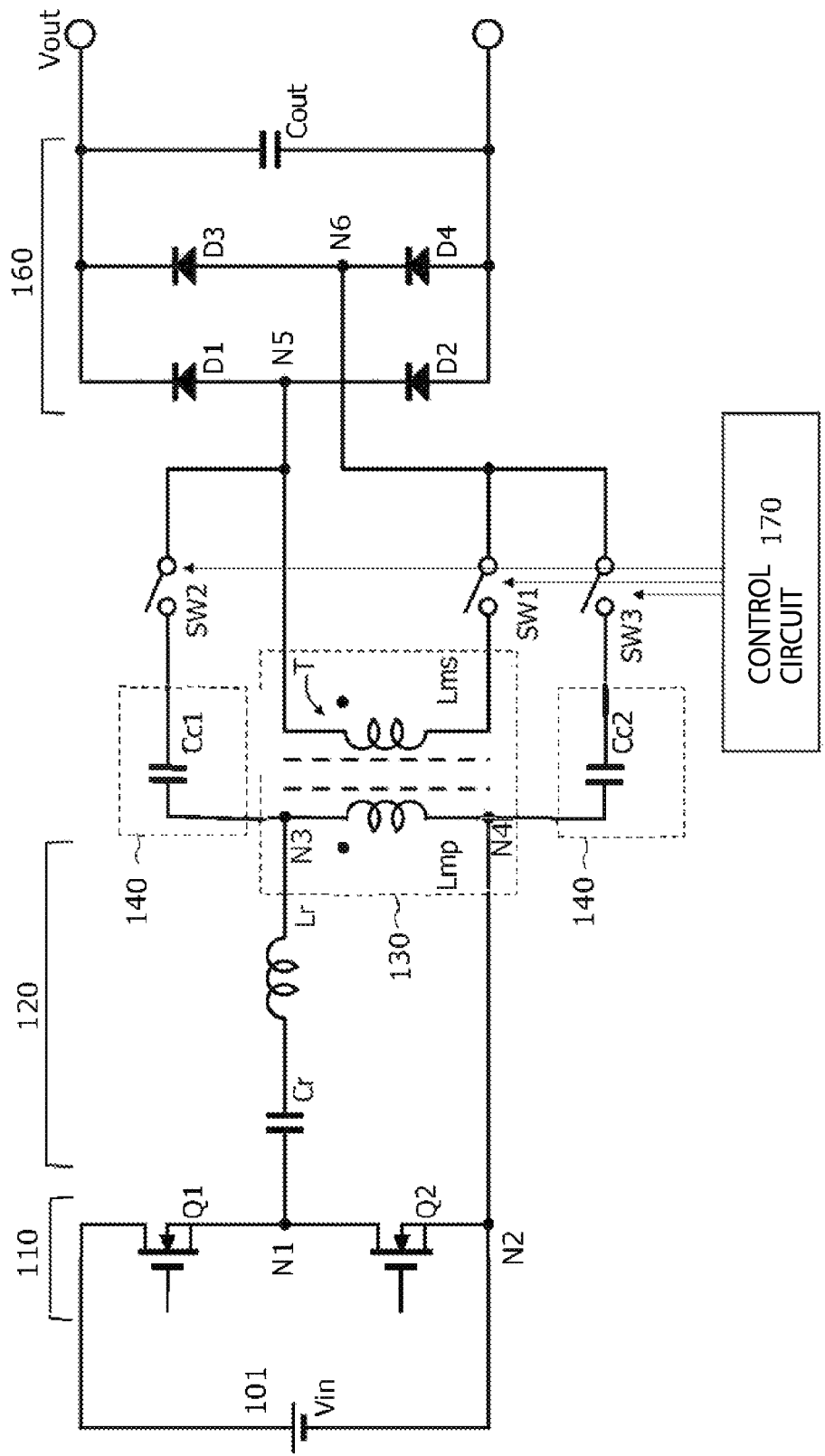
FIG. 3 is a diagram illustrating an example where a control circuit that controls a switching circuit is provided in the electronic circuitry 1 of FIG. 1.

FIG. 3 illustrates an example where a control circuit that controls the switches SW1 to SW3 is provided in the electronic circuitry 1 of FIG. 1.

When the first transmission circuit 130 (transmission path by magnetic coupling) is to be selected, a control circuit 170 transmits a control signal to turn on the switch SW1, to the switch SW1; and transmits a control signal to turn off the switches SW2 and SW3, to the switches SW2 and SW3. On the other hand, when the second transmission circuit 140 (transmission path by electric field coupling) is to be selected, the control circuit 170 transmits a control signal to turn off the switch SW1, to the switch SW1; and transmits a control signal to turn on the switches SW2 and SW3, to the switches SW2 and SW3. The switches SW1 to SW3 are turned on or off based on the control signal from the control circuit 170. The control circuit 170 may determine whether to select the first transmission circuit 130 or the second transmission circuit 140, based on an instruction signal from an external circuit. For example, when the control circuit 170 receives a signal indicating an output voltage setting which is a large voltage, it selects the second transmission circuit 140 (transmission path by electric field coupling) and when the setting is a small voltage, selects the first transmission circuit 130 (transmission path by magnetic coupling).

The resonant frequency differs between a circuit configuration in a magnetic field coupling scheme (see FIG. 2A) and a circuit configuration in an electric field coupling scheme (see FIG. 2B) due to the effect of the capacitors Cc1 and Cc2.

The resonant frequency fr of the resonant circuit 120 in the magnetic field coupling scheme is represented by the following equation (1):

[Math. 1]

$$f_r = \frac{1}{2\pi\sqrt{C_r \cdot L_r}} \quad (1)$$

The resonant frequency fr of the resonant circuit 120 in the electric field coupling scheme is represented by the following equation (2):

[Math. 2]

$$f_r = \frac{1}{2\pi\sqrt{C_n \cdot L_r}} \quad (2)$$

$$C_n = \left(\frac{1}{C_r} + \frac{1}{C_{c1}} + \frac{1}{C_{c2}}\right)^{-1}$$

In the equation (2), Cn is the combined capacity of the capacitors Cr, Cc1, and Cc2.

For example, assuming that Cr, Cc1, and Cc2 are the same value, the resonant frequency in the electric field coupling scheme is √3 (=3^{1/2}) times the one in the magnetic field scheme. Therefore, the operation frequency fsw in the square-wave generation circuit 110 may be changed between the magnetic field coupling scheme and the electric field coupling scheme. For example, the operation frequency fws in the electric field coupling scheme may be set higher than that in the magnetic field coupling scheme. It should be noted that it is preferable to set the operation frequency fsw of the square-wave generation circuit 110 to a value that is a little smaller than the resonant frequency fr of the resonant circuit 120 so as to cause a phase delay and thereby, establish soft switching. Soft switching of switching elements Q1 and Q2 of the square-wave generation circuit 110 allows a reduction in the power loss of the elements. The preferable ratio fsw/fr between the operation frequency fsw and the resonant frequency fr is about 0.9, for example. A gain (that is proportional to a ratio between the output voltage of the first transmission circuit 130 and second transmission circuit 140 and the input voltage) varies according to the operation frequency fsw and therefore, the operation frequency may be determined according to a gain necessary to obtain a desired output voltage Vout.

As described above, according to the embodiment, in the case of outputting a small voltage, a voltage is transmitted through a transformer (magnetic field coupling); and in the case of outputting a large voltage, a voltage is transmitted through capacitors (electric field coupling). This makes it possible to perform a DC-DC conversion of a voltage with a low loss irrespective of the magnitude of an output voltage.

(First Modification)

In the above-described embodiment, the number of windings of the secondary inductor Lms is predetermined; however, a mechanism may be provided in which an output voltage setting (target value) can be selected from among a plurality thereof and the number of windings of the secondary inductor is adjusted according to the selected setting. When the configuration of FIG. 3 described above is used, the control circuit 170 may transmit, to the mechanism, a signal to adjust the number of windings of the secondary inductor according to the target value, based on the output voltage setting. The mechanism adjusts the number of windings based on the signal. This modification allows an output voltage to be adjusted in a wider range than in adjustment of the operation frequency fsw and also allows a DC-DC conversion to be performed in a wide range with a low loss.

(Second Modification)

Figure 4:
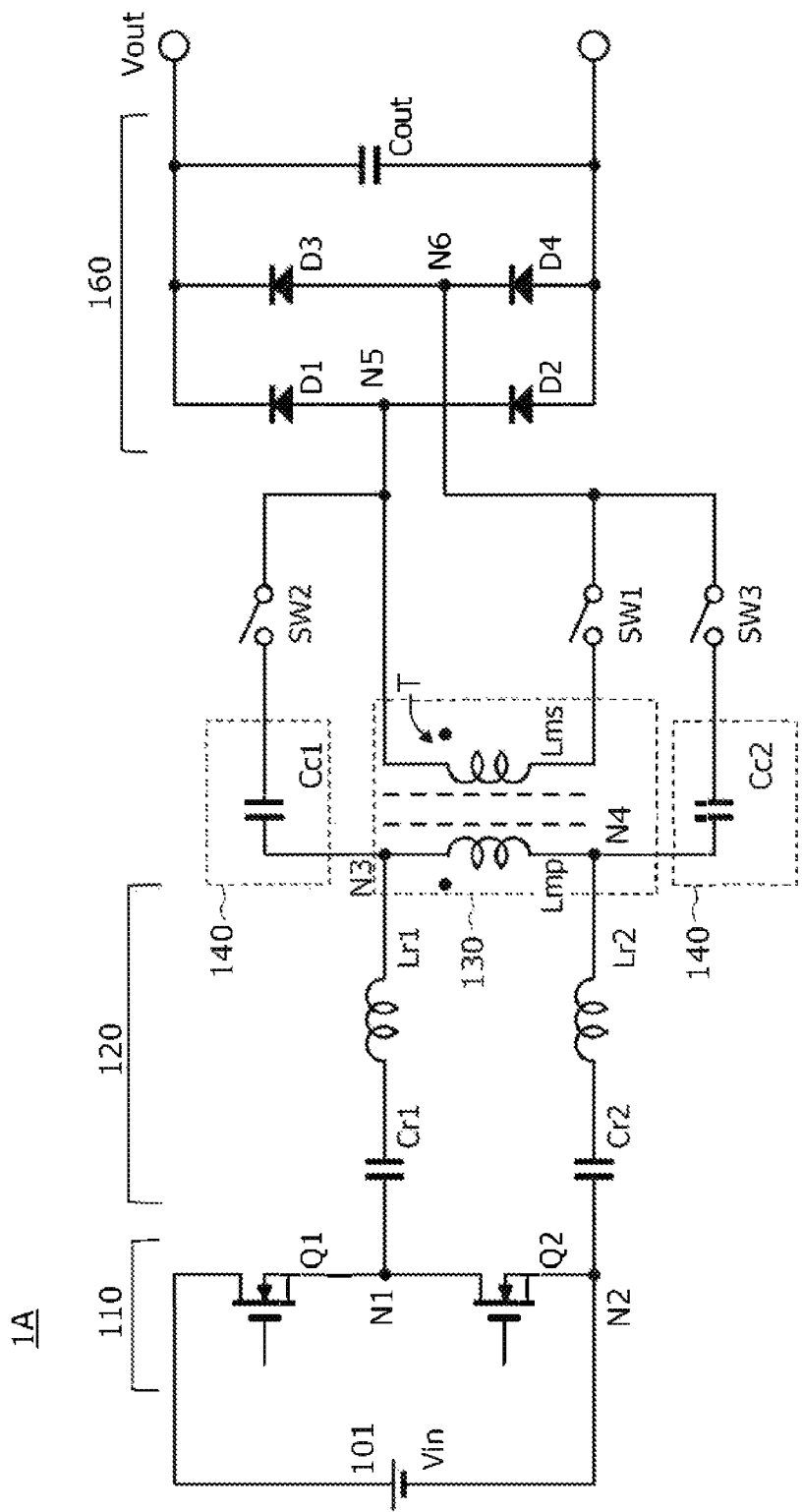
FIG. 4 is a block diagram illustrating an example of electronic circuitry according to a second modification.

FIG. 4 is a block diagram illustrating an example of electronic circuitry 1A according to a second modification. The resonant circuit 120 additionally includes a capacitor Cr2 (fourth capacitor) and an inductor Lr2 (fourth inductor). The capacitor Cr2 and the inductor Lr2 are connected in series between the second output end N2 of the square-wave generation circuit 110 and a second end of the primary inductor (second output end N4 of the resonant circuit 120). The resonant frequency fr of the resonant circuit 120 also depends on the capacitance value of the capacitor Cr2 and the inductance value of the inductor Lr2. The capacitor Cr2 may form part of the second transmission circuit 140 (that is, the capacitor Cr2 is included in both the resonant circuit 120 and the second transmission circuit 140).

(Third Modification)

Figure 5:
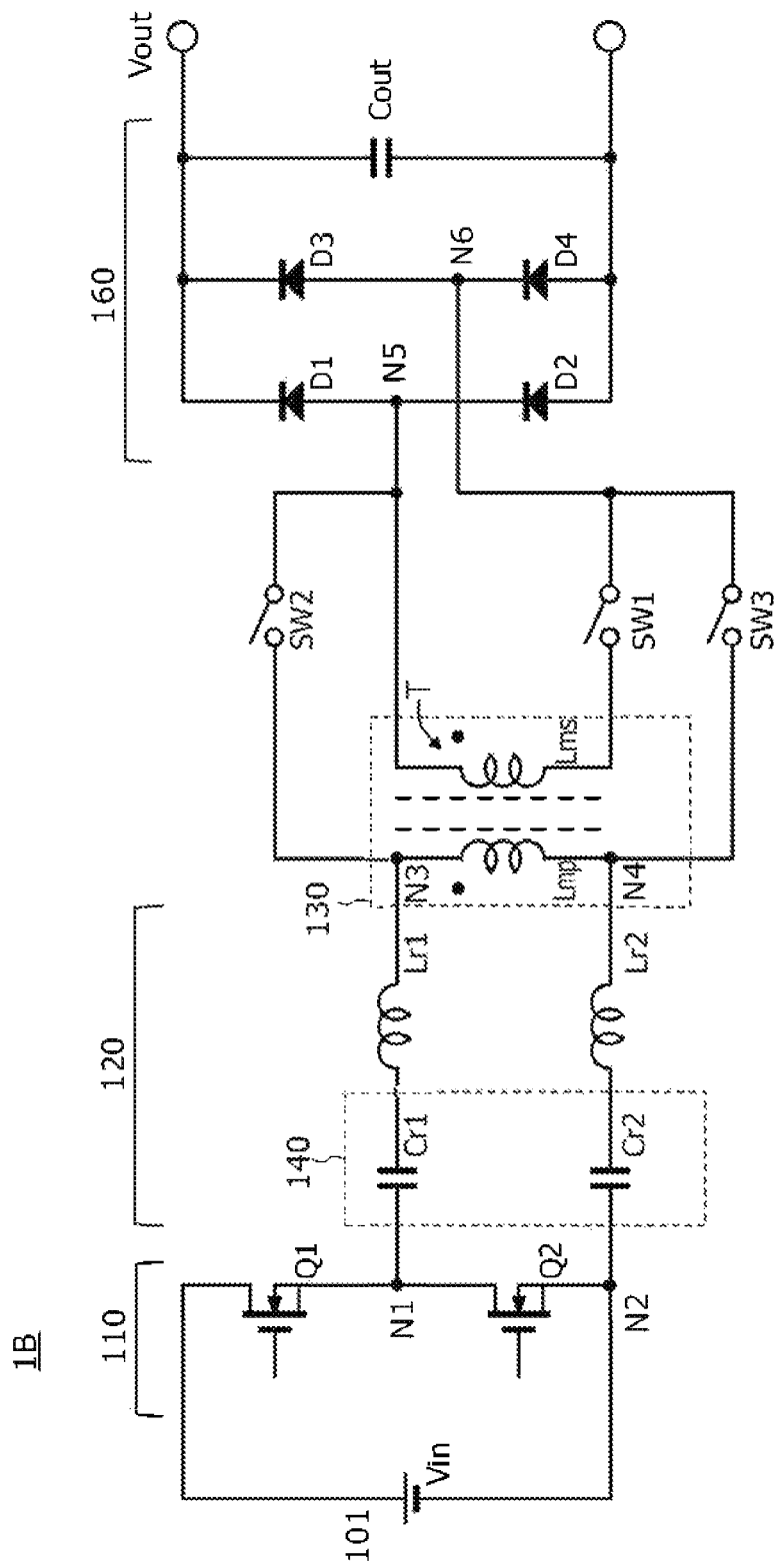
FIG. 5 is a block diagram illustrating an example of electronic circuitry according to a third modification.

FIG. 5 illustrates an example of electronic circuitry 1B according to a third modification. The capacitors Cc1 and Cc2 have been eliminated from the electronic circuitry 1A of FIG. 4. The capacitors Cr1 and Cr2 included in the resonant circuit 120 function as capacitors for electric field coupling. The capacitors Cr1 and Cr2 are included in the second transmission circuit 140 that transmits a voltage by capacitive coupling. The capacitor Cr1 corresponds to the first capacitor or the third capacitor that transmits, by electric field coupling, a sinusoidal voltage (first voltage) that is output by the resonant circuit 120. The capacitor Cr2 corresponds to the second capacitor or the fourth capacitor that transmits, by electric field coupling, a sinusoidal voltage (first voltage) that is output by the resonant circuit 120.

(Fourth Modification)

Figure 6:
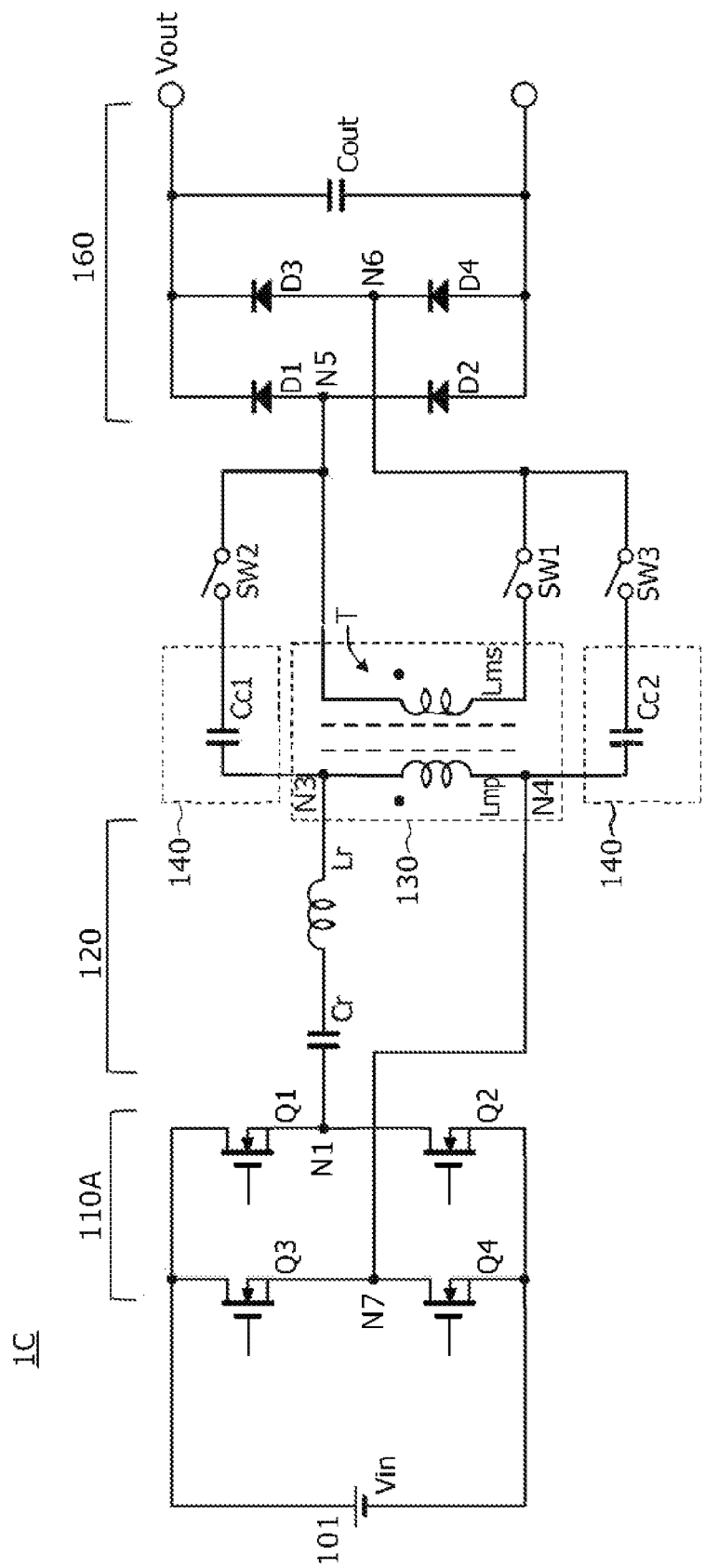
FIG. 6 is a block diagram illustrating an example of electronic circuitry according to a fourth modification.

FIG. 6 is a block diagram illustrating an example of electronic circuitry 1C according to a fourth modification.

There is provided a square-wave generation circuit 110A, which uses, instead of the half bridge configuration in FIG. 1, a full bridge configuration in which four switching elements Q1, Q2, Q3, and Q4 are connected.

The switching elements Q3 and Q4 are connected in series to the voltage source 101. The switching elements Q3 and Q4 are connected in parallel to the switching elements Q1 and Q2. A connection node N1 (first output end) between the switching elements Q1 and Q2 is connected to one end of the capacitor Cr. A connection node N7 between the switching elements Q3 and Q4 is connected to the second end of the primary inductor Lmp (second output end N4 of the resonant circuit 120). When a square-wave voltage with a duty ratio of ½ is generated by the switching elements Q1 and Q2 and a square-wave voltage with a duty ratio of ½ is generated by the switching elements Q3 and Q4, an output voltage Vout obtained through a transmission path by electric field coupling is approximately the same as an input voltage Vin. Therefore, in order to obtain Vin as an output voltage, the full bridge configuration is used; and in order to obtain 2/Vin, the half bridge configuration in FIG. 1 described above is used.

(Fifth Modification)

Figure 7:
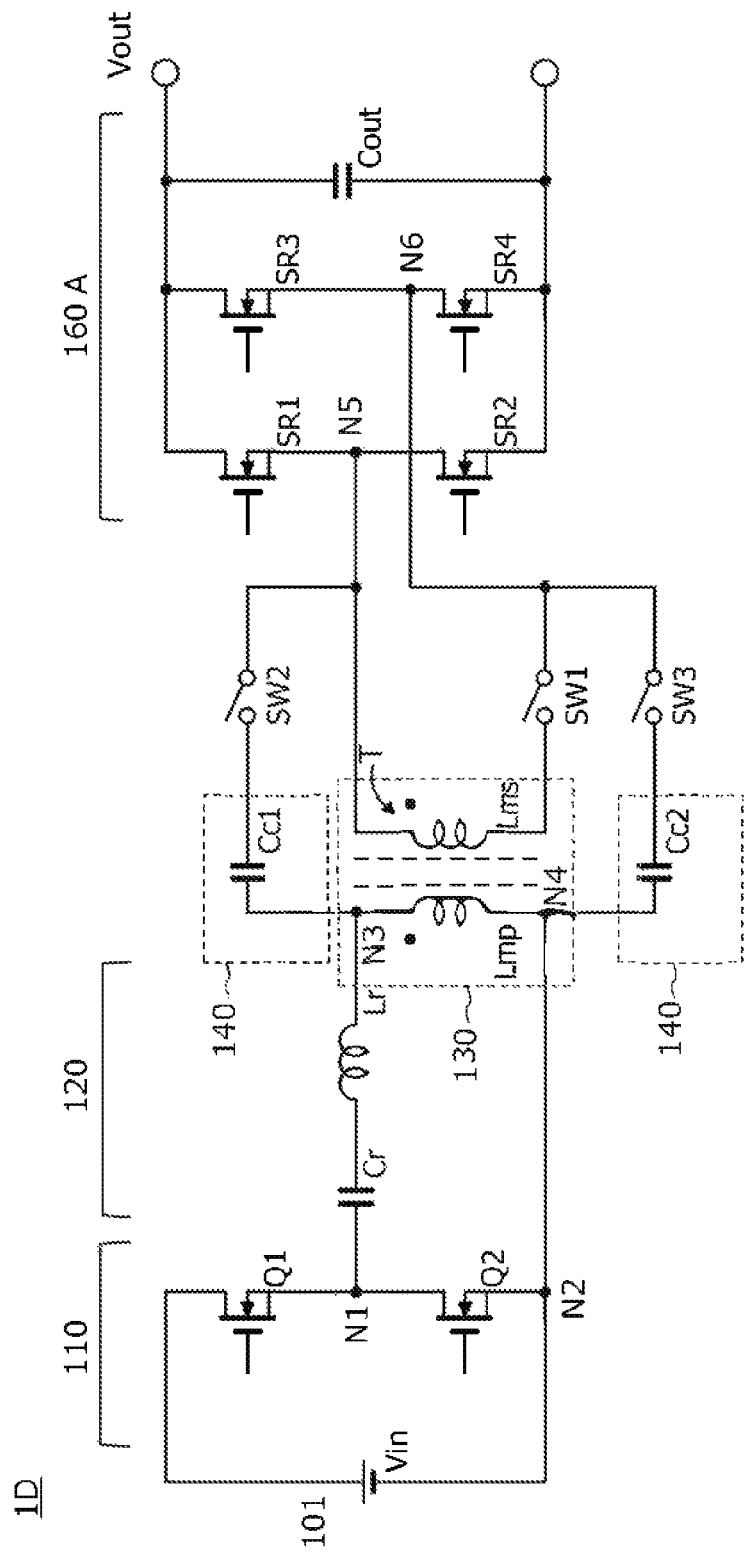
FIG. 7 is a block diagram illustrating an example of electronic circuitry according to a fifth modification.

FIG. 7 is a block diagram illustrating an example of electronic circuitry 1D according to a fifth modification.

As rectifier elements in a rectifier circuit 160A, switching elements SR1, SR2, SR3, and SR4 are used instead of the diodes D1 to D4. The switching elements SR1 to SR4 are N-type MOSFETs; however, they may be P-type MOSFETs, or transistors of other types. Although the configuration of FIG. 7 requires a circuit (not illustrated) that controls the switching elements SR1 to SR4, it can reduce a conduction loss as compared to the case of using the diodes D1 to D4.

(Sixth Modification)

Figure 8:
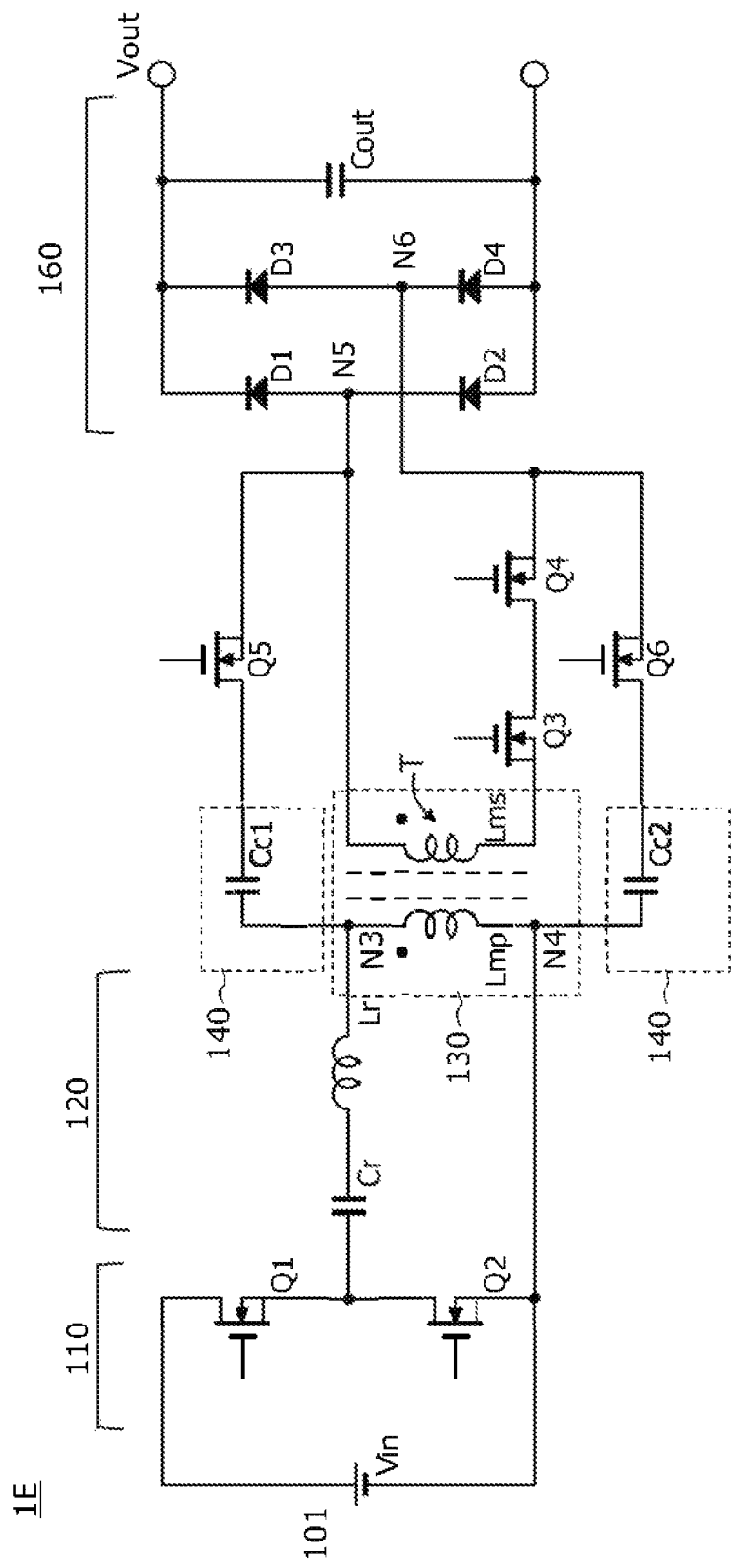
FIG. 8 is a block diagram illustrating an example of electronic circuitry according to a sixth modification.

FIG. 8 is a block diagram illustrating an example of electronic circuitry 1E according to a sixth modification. In this example, the switches SW1, SW2, and SW3 of FIG. 1 are realized by switching elements. Switching elements Q3 and Q4 correspond to the switch SW1 of FIG. 1; a switching element Q5 correspond to the switch SW2 of FIG. 1; and a switching element Q6 corresponds to the switch SW3 of FIG. 1. The switching elements Q3 to Q6 are N-type MOSFETs; however, they may be P-type MOSFETs, or transistors of other types. As the switching elements Q3 to Q6, SiC-MOSFETs may be used. The switching elements Q3 and Q4 are connected in series between the second terminal of the secondary inductor Lms and the second input end N6 of the rectifier circuit 160. The switching elements Q3 and Q4 each has a source and a drain in a reverse configuration so as to prevent conduction via a body diode. The switching elements Q3 and Q4 are turned on at the same time, or are turned off at the same time.

(Seventh Modification)

Figure 9:
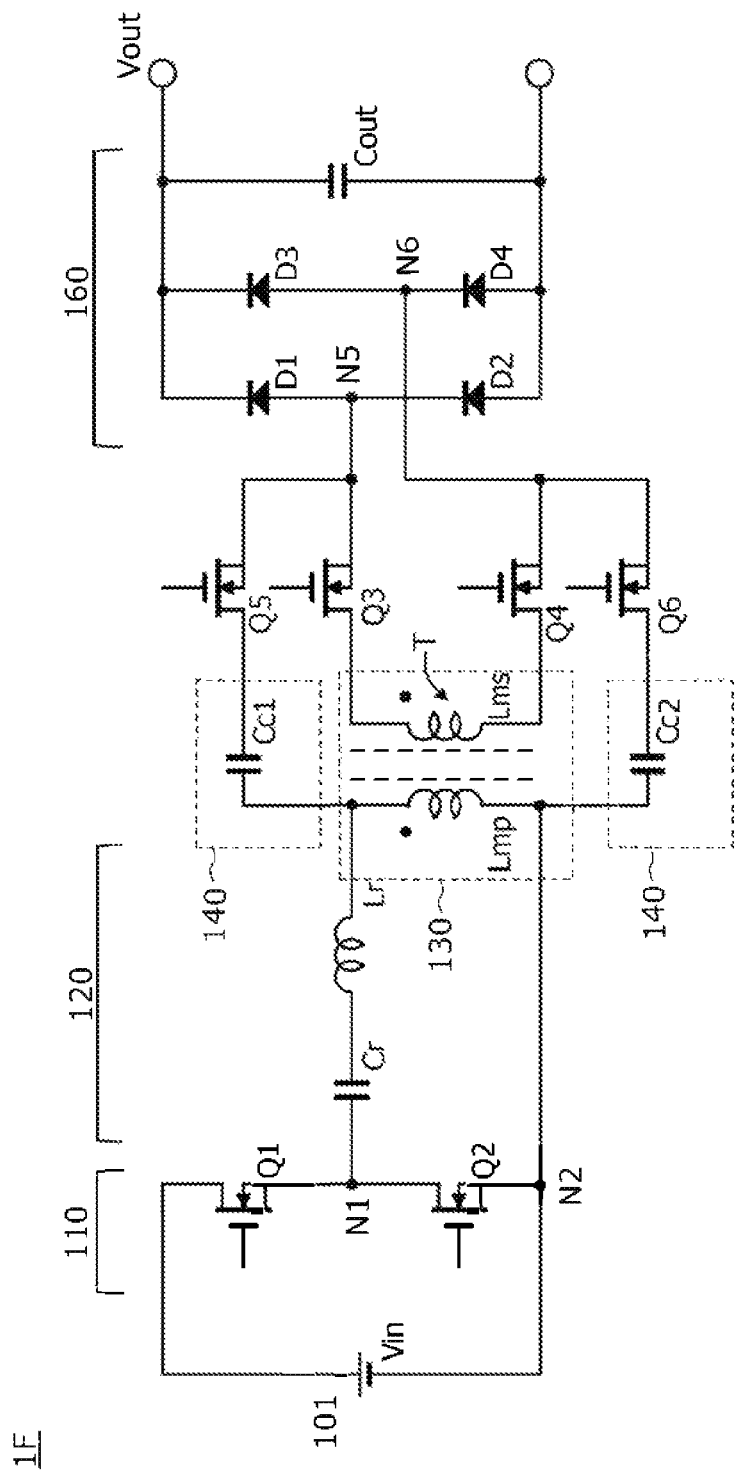
FIG. 9 is a block diagram illustrating an example of electronic circuitry according to a seventh modification.

FIG. 9 is a block diagram illustrating an example of electronic circuitry 1F according to a seventh modification. The position of the switching element Q3 in FIG. 8 described above has been changed. A switching element Q3 is a switch (third switch) that connects between the first end of the secondary inductor Lms and the first input end N5 of the rectifier circuit 160. The switching elements Q3 is turned on at the same time as the switching element Q4, or is turned off at the same time as the switching element Q4.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. Electronic circuitry, comprising:
   a resonant circuit configured to receive a square-wave voltage based on a first DC voltage and generate a first voltage;
   a first transmission circuit configured to transmit the first voltage via a transformer including a primary inductor and a secondary inductor;
   a second transmission circuit configured to transmit the first voltage via a first capacitor and a second capacitor, the first capacitor being electrically connected to a first end of the primary inductor, the second capacitor being electrically connected to a second end of the primary inductor;
   a rectifier circuit configured to rectify the first voltage and generate a second DC voltage, the first voltage being transmitted by the first transmission circuit or the second transmission circuit;
   a first switch circuit configured to connect the first transmission circuit and the rectifier circuit; and
   a second switch circuit configured to connect the second transmission circuit and the rectifier circuit.

2. The electronic circuitry according to claim 1, wherein the second switch circuit includes a first switch and a second switch, the first switch connecting between the first capacitor and a first input end of the rectifier circuit; the second switch connecting between the second capacitor and a second input end of the rectifier circuit.

3. The electronic circuitry according to claim 1, wherein the first switch circuit includes at least either one of a third switch and a fourth switch, the third switch being connected between a first terminal of the secondary inductor and a first input end of the rectifier circuit, the fourth switch being connected between a second terminal of the secondary inductor and a second input end of the rectifier circuit.

4. The electronic circuitry according to claim 1, further comprising:
   a square-wave generation circuit configured to generate the square-wave voltage by modulating the first DC voltage;
   wherein the resonant circuit includes a third capacitor and a first inductor that are connected in series between a first output end of the square-wave generation circuit and a first end of the primary inductor.

5. The electronic circuitry according to claim 4, wherein the resonant circuit includes a fourth capacitor and a second inductor that are connected in series between a second output end of the square-wave generation circuit and a second end of the primary inductor.

6. The electronic circuitry according to claim 2, wherein the first switch and the second switch each includes a transistor.

7. The electronic circuitry according to claim 3, wherein at least either one of the third switch and the fourth switch includes a transistor.

8. The electronic circuitry according to claim 7, wherein at least either one of the third switch and the fourth switch includes a plurality of the transistors connected in series.

9. The electronic circuitry according to claim 4, comprising:
   a voltage source configured to generate the first DC voltage;
   wherein the square-wave generation circuit includes a first switching element and a second switching element that are connected in series to the voltage source, and generates the square-wave voltage by controlling the first switching element and the second switching element.

10. The electronic circuitry according to claim 9, wherein the square-wave generation circuit includes a third switching elements and a fourth switching element that are connected in series to the voltage source, the third switching element and the fourth switching element being connected in parallel to the first switching element and the second switching element, and generates the square-wave voltage by controlling the first switching element to the fourth switching element.

11. The electronic circuitry according to claim 1, wherein the rectifier circuit includes a first rectifier element, a second rectifier element, a third rectifier element, and a fourth rectifier element, the first rectifier element and the second rectifier element being connected in series, the third rectifier element and the fourth rectifier element being connected in series, the third rectifier element and the fourth rectifier element being connected in parallel to the first rectifier element and the second rectifier element, and rectifies the first voltage by controlling the first rectifier element to the fourth rectifier element.

12. The electronic circuitry according to claim 11, wherein the first rectifier element to the fourth rectifier element each includes a diode.

13. The electronic circuitry according to claim 11, wherein the first rectifier element to the fourth rectifier element each includes a transistor.

14. The electronic circuitry according to claim 1, wherein the first switch circuit performs connection or disconnection between the first transmission circuit and the rectifier circuit according to setting of the second DC voltage; and
   the second switch circuit performs disconnection or connection between the second transmission circuit and the rectifier circuit according to the setting of the second DC voltage.

15. The electronic circuitry according to claim 14, wherein
   the first switch circuit performs, when the setting is a low voltage, connection between the first transmission circuit and the rectifier circuit, and performs, when the setting is a higher voltage than the low voltage, disconnection between the first transmission circuit and the rectifier circuit; and
   the second switch circuit performs, when the setting is the low voltage, disconnection between the second transmission circuit and the rectifier circuit, and performs, when the setting is a higher voltage than the low voltage, connection between the second transmission circuit and the rectifier circuit.

16. The electronic circuitry according to claim 1, wherein the number of windings of wiring of the secondary inductor is less than the number of windings of wiring of the primary inductor.

17. A method of converting a first DC voltage into a second DC voltage, comprising:
- modulating the first DC voltage to generate a square-wave voltage;
- supplying the square-wave voltage to a resonant circuit to generate a first voltage;
- when a setting of the second DC voltage is set to a low voltage, transmitting the first voltage based on magnetic coupling;
- when the setting of the second DC voltage is set to a higher voltage than the low voltage, transmitting the first voltage based on electric field coupling; and
- rectifying the first voltage transmitted based on the magnetic coupling or the electric field coupling, to generate the second DC voltage.

* * * * *